United States Patent
Tazoi et al.

(10) Patent No.: US 6,246,685 B1
(45) Date of Patent: Jun. 12, 2001

(54) DEVICE FOR ASSEMBLING CELLS IN RESPONSE TO HOW DATA ARE STORED IN A BUFFER

(75) Inventors: Yasuhiro Tazoi; Kyouta Shimizu; Kenichi Toya, all of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 08/937,522

(22) Filed: Sep. 25, 1997

(30) Foreign Application Priority Data

Feb. 7, 1997 (JP) .................................................. 9-024636

(51) Int. Cl.$^7$ .................................................. H04L 12/56
(52) U.S. Cl. ............................................ 370/395; 370/474
(58) Field of Search ................................. 370/229–238, 370/412, 428, 429, 474, 395, 473

(56) References Cited

U.S. PATENT DOCUMENTS

| | | | |
|---|---|---|---|
| 4,878,218 | * 10/1989 | Takada | 370/94 |
| 5,160,923 | * 11/1992 | Sugawara et al. | 370/85.6 |
| 5,757,770 | * 5/1998 | Lagoutte et al. | 370/229 |
| 5,870,384 | * 2/1999 | Salovuori et al. | 370/235 |
| 5,898,689 | * 4/1999 | Kumar et al. | 370/232 |
| 6,002,675 | * 12/1999 | Ben-Michael et al. | 370/315 |

* cited by examiner

Primary Examiner—Chau Nguyen
Assistant Examiner—D. Trinh
(74) Attorney, Agent, or Firm—Venable; Robert J. Frank; Michael A. Sartori

(57) ABSTRACT

In a cell assembling device, an ATM cell assemblage decomposes input signals channel by channel and outputs channel-by-channel signals. At the same time, the cell assemblage generates a write control signal. Further, when one cell of data is written to a buffer, the cell assemblage generates a condition report signal for informing an arbitrating circuit of the channel of the cell. In response, the arbitrating circuit determines a channel to read out on the basis of the amounts of cell data stored in the buffer, and then outputs a read control signal meant for the above channel. On receiving the write control signal, the buffer writes the channel-by-channel signal therein. In response to the read control signal, the buffer outputs the signal of the channel designated by the signal and feeds it to a cell transmission circuit. The transmission circuit adds a cell header to the data output from the buffer to thereby form a cell to be sent.

16 Claims, 14 Drawing Sheets

| ADDRESS | DATA |
|---|---|
| ch0 -- 0 | D0 |
| ch1 -- 1 | D1 |
| ch2 -- 2 | D2 |
| ⋮ | ⋮ |
| chn -- n | Dn |

| ADDRESS | DATA |
|---|---|
| ch0 -- 0 | D0 |
| ch1 -- 1 | D1 |
| ch2 -- 2 | D2 |
| ⋮ | ⋮ |
| chn -- n | Dn |

| ADDRESS | DATA |
|---|---|
| ch0 -- 0 | P0 |
| ch1 -- 1 | P1 |
| ch2 -- 2 | P2 |
| ⋮ | ⋮ |
| chn -- n | Pn |

DEVICE FOR ASSEMBLING CELLS IN RESPONSE TO HOW DATA ARE STORED IN A BUFFER

BACKGROUND OF THE INVENTION

1. Field of the Invention

The present invention relates to a cell assembling device and, more particularly, to the arbitration of the order of cell transmission to be effected when, e.g., a plurality of channels of speeches or data are sent in the form of ATM (Asynchronous Transfer Mode) cells.

2. Description of the Background Art

ATM communication apparatuses and ATM switches have recently been proposed in various forms. An ATM communication apparatus, for example, is constructed to receive a speech signal and transform it to cells having a fixed length, or to transform communication data input from a terminal unit to cells. The ATM communication apparatus may be constructed to receive a plurality of parallel speech signals or data alone and multiplex them into ATM cells. It has been customary with the apparatus of the type receiving parallel speech signals or data to fix the order of ATM cell transmission, to send assembled ATM cells in a preselected order.

When a plurality of channels of speech signals or data are sent in the form of channel-by-channel ATM cells, it is necessary to set up an optimal transmission order in conformity to the transmission rates of the individual speech signals (e.g., 64 kbps (kilobits per second), 32 kbps or 16 kbps) or the data. Further, every time the bit rate or the data rate is changed, the optimal transmission order must be changed.

Moreover, when the configuration is noticeably different from one channel to another channel, it is likely that the required capacity of an ATM cell assemblage buffer increases or that the buffer overflows and causes data to be discarded, depending on the transmission order.

SUMMARY OF THE INVENTION

It is therefore an object of the present invention to provide a cell assembling device capable of forming, when a plurality of channels of signals are input in parallel, cells efficiently with a simple construction even if the signals each has a particular channel configuration, frequency band or rate.

A cell assembling device of the present invention includes a n input circuit for receiving a plurality of channels of input signals in parallel and decomposing each input signal into unit data necessary for forming a cell. A storage temporarily stores the unit data decomposed channel by channel and outputs one unit data designated by a read command. A cell forming circuit adds cell header information to the unit data output from the storage to thereby form a cell. An arbitrating circuit monitors a condition in which the unit data are stored in the storage channel by channel, and generates the read command matching with the condition and feeds it to the storage.

BRIEF DESCRIPTION OF THE DRAWINGS

The objects and features of the present invention will become more apparent from the consideration of the following detailed description taken in conjunction with the accompanying drawings in which:

FIG. 3 shows an arbitration RAM (Random Access Memory) also included in the first embodiment in detail;

FIG. 6 shows an arbitration RAM included in the second embodiment in detail;

FIG. 7 shows a priority RAM also included in the second embodiment;

Figure 1:
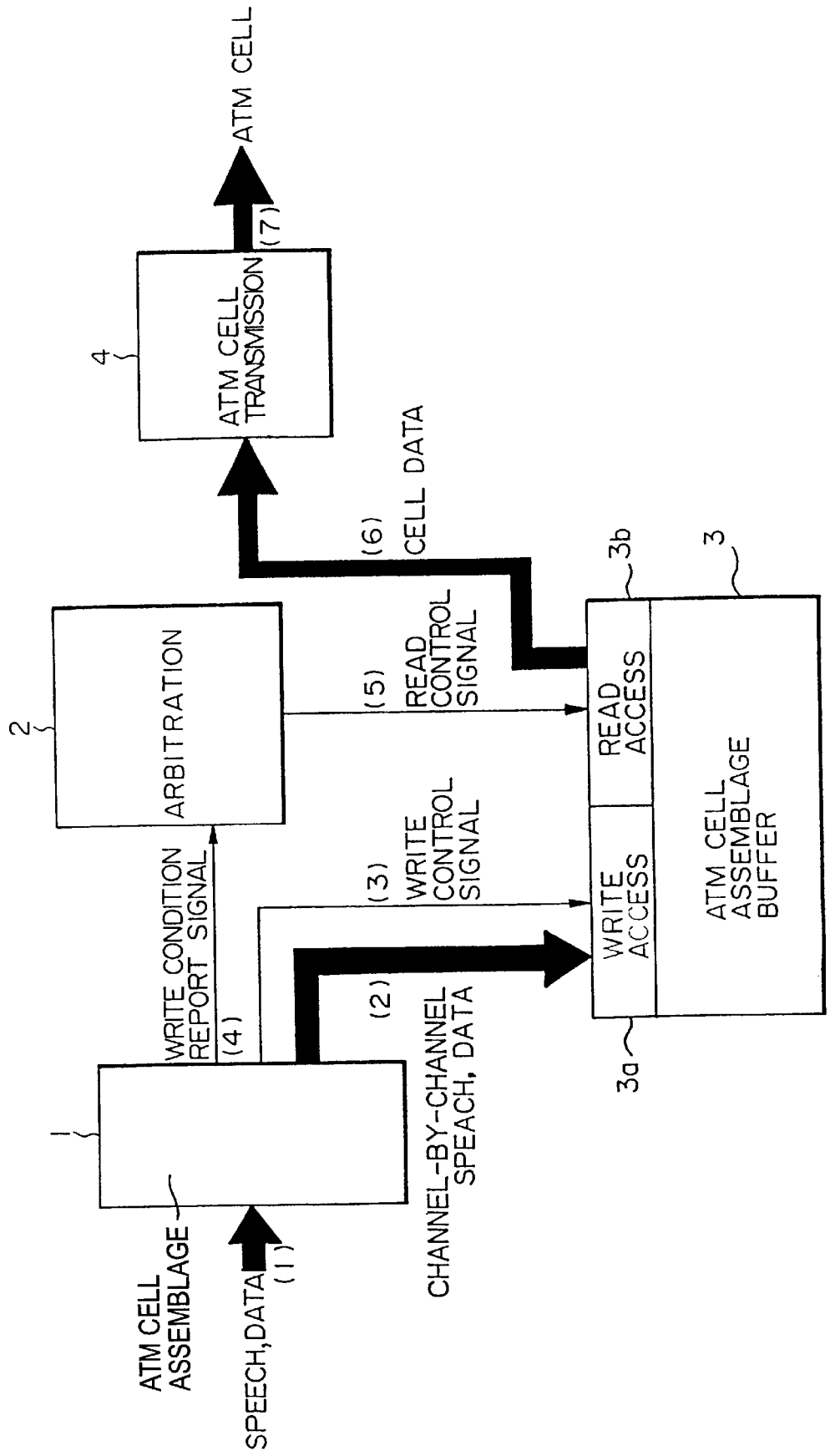
FIG. 1 is a block diagram schematically showing a first embodiment of a cell assembling device in accordance with the present invention.

In the drawings, identical references designate identical structural elements and identical signals.

DESCRIPTION OF THE PREFERRED EMBODIMENTS

Preferred embodiments of the cell assembling device in accordance with the present invention will be described hereinafter.

First Embodiment

Briefly, in the event of transmission of input speeches or data in the form of ATM cells, this embodiment selects a particular order of cell transmission by use of a RAM holding the assembling condition of the cells.

Referring to FIG. 1, a cell assembling device embodying the present invention includes an ATM cell assemblage 1 to which a plurality of channels of speech signals or data are input. Signals and data appearing in the following description are designated by parenthesized reference numerals. The ATM cell assemblage 1 processes the input speech signals or data so as to output channel-by-channel speech or data (2). At the same time, the assemblage 1 generates a write control signal (3) and a write condition report signal (4) representative of the current writing condition. An arbitration 2 generates, based on the write condition report signal (4), a read control signal (5) and feeds it to an ATM cell assemblage buffer 3. In response, the ATM cell assemblage buffer 3 temporarily stores the channel-by-channel speech signals or data therein, and reads them out in the form of payload data (6) for forming a cell. An ATM cell transmission 4 adds an ATM cell header to the payload data (6) to thereby form an ATM cell (7) and then sends the cell (7).

Specifically, the ATM cell assemblage 1 decomposes the input speech signals or data (1) channel by channel and outputs the resulting channel-by-channel speech or data (2). At the same time, the assemblage 1 feeds the write control signal (3) to a write access 3a included in the ATM cell assemblage buffer 3. When one cell of ATM data is written to the buffer 3, the assemblage 1 delivers the write condition report signal (4) to the arbitration 2, informing it of the channel of the ATM data.

The arbitration 2, sequentially receiving the write condition report signals (4), determines a channel to read out on the basis of the amounts of ATM cell data written to the buffer 3 channel by channel. Then, the arbitration 2 generates the read control signal (5) indicative of the determined channel and delivers it to a read access 3b also included in the buffer 3.

On receiving the write control signal (3) from the ATM cell assemblage 1, the buffer 3 temporarily stores the channel-by-channel speech signals or data (2) therein. Then, in response to the read control signal (5) input from the arbitration 2, the buffer 3 outputs the speech or data of the channel designated by the signal (5) and feeds it to the ATM cell transmission 4 as the payload data (6). The transmission 4 adds data representative of an ATM cell header to the payload data (6) and sends the resulting ATM cell (7), as stated earlier.

Figure 2:
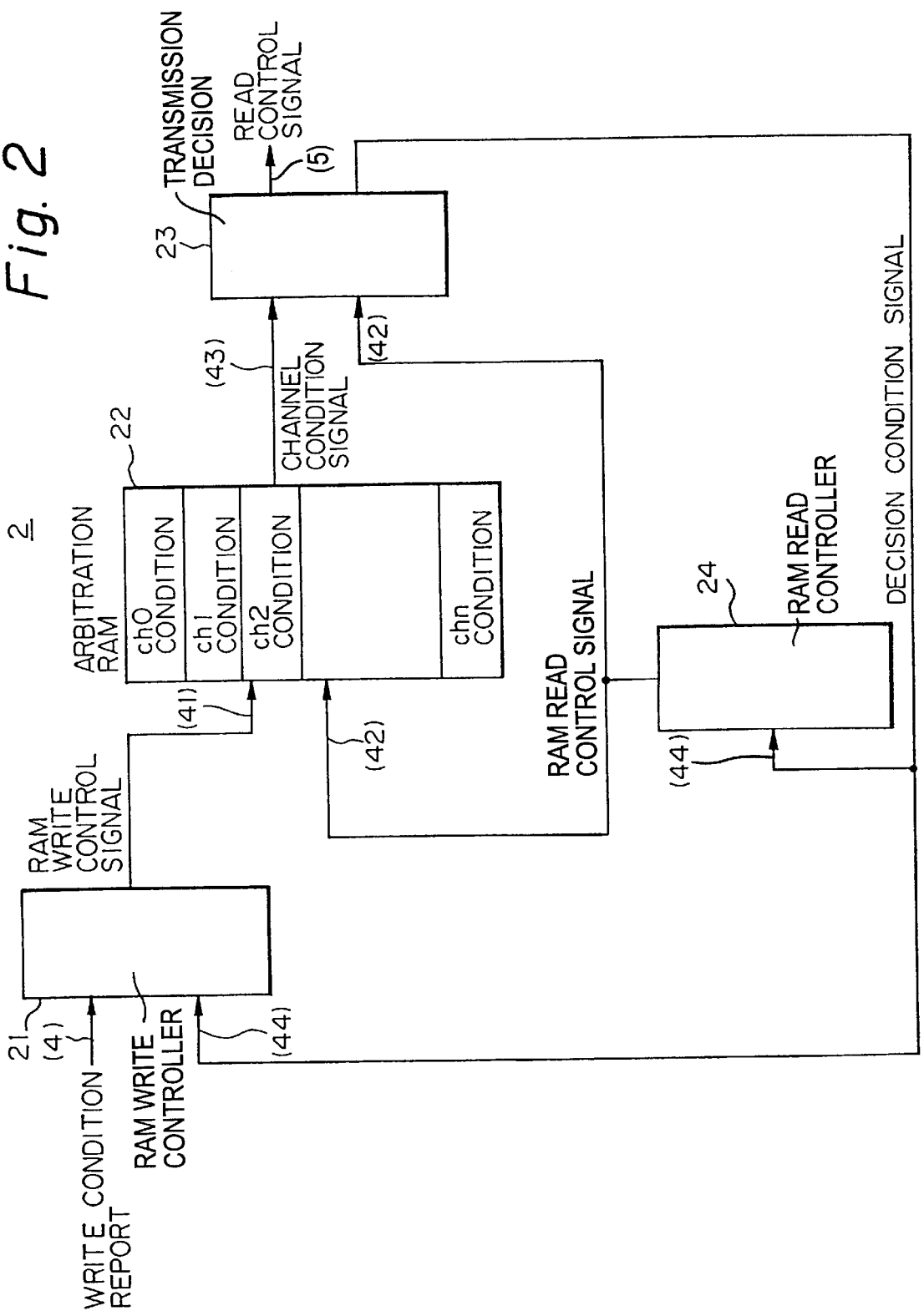
FIG. 2 is a block diagram schematically showing a specific configuration of an arbitration circuit included in the first embodiment.

FIG. 2 shows a specific configuration of the arbitration 2 which is one of the major features of the illustrative embodiment. As shown, the arbitration 2 is made up of a RAM write controller 21, an arbitration RAM 22, a transmission decision 23, and a RAM read controller 24. The RAM write controller 21 feeds a RAM write control signal (41) to the arbitration RAM 22 for controlling the writing of the write condition report signal (4) in the arbitration RAM 22. The RAM read controller 24 delivers a RAM read control signal (42) to the arbitration RAM 22. The arbitration RAM 22 stores the RAM write control signal (41) therein and outputs a channel condition signal (43) designated by the RAM read control signal (42).

The transmission decision 23 receives the channel condition signal (43) output from the arbitration RAM 22 and the RAM read control signal (42) output from the RAM read controller 24. The decision 23 determines, based on the input signals (43) and (42), whether or not any ATM cell data is present in the ATM cell assemblage buffer 3, FIG. 1. If ATM cell data is present, the decision 23 feeds the read control signal (5) to the buffer 3 in order to select the channel of the cell data for a channel to be transmitted. At the same time, the decision 23 generates a decision condition signal (44) and delivers it to the RAM write controller 21 and RAM read controller 24. The read control signal (5) may be implemented as a read channel signal or a read trigger signal by way of example.

The RAM read controller 24 outputs the RAM read control signal (42) either periodically or in accordance with the cell transmission condition on the basis of the decision condition signal (44). It is to be noted that the RAM write controller 21 generates, depending on the decision condition signal (44), the RAM write control signal (41) for clearing the channel condition signal (one of ch0 condition, ch1 condition, ch2 condition, . . . , chn condition) of the channel of the arbitration RAM 22 sent as a result of the transmission decision The arbitration RAM 22 is shown in FIG. 3 in detail. As shown, the arbitration RAM 22 has a series of addresses 0 through n respectively assigned to the channels ch0 through chn. Data D0 is written to the address 0. When the address 0 is a (logical) ONE, it shows that one ATM cell of cell data of the channel ch0 is stored in the ATM cell assemblage buffer 3. Likewise, data D1 and D2 are respectively written to the addresses 1 and 2 assigned to the channels ch1 and ch2. Data Dn is written to the address n assigned to the channel chn. When any one of the addresses D1 through Dn is a ONE, it shows that one ATM cell of cell data of the associated channel is present in the buffer 3.

In operation, the ATM cell assemblage 1 decomposes the multiplexed speech signals or data (1) channel by channel and writes the resulting channel-by-channel speeches or data in the ATM cell assemblage buffer 3. At this instant, the assemblage 1 recognizes whether or not it has written some data in the buffer 3 channel by channel. The assemblage 1 feeds to the arbitration 2 the write condition report signal (4) showing the channel storing one ATM cell of cell data.

In response to the write condition report signal (4), the arbitration 2 changes the data stored in the channel of the arbitration RAM 22 designated by the signal (4) to a ONE. The RAM read controller 24 causes the channel condition signal (43) to be read out of the RAM 22 with the RAM read control signal (42). If the signal (43) is a ONE, the arbitration 2 delivers the read control signal (5) to the read access 3b of the buffer 3, so that the ATM transmission 4 can read out the ATM cell data of the channel represented by the signal (43).

The decision condition signal (44) output from the transmission decision 23 informs the RAM write controller 21 and RAM read controller 24 of the fact that a ONE is read out as the channel condition signal (43), and the read control signal (5) is generated in order to send the ATM cell. In addition, one of the channel condition data ch0 through chn of the RAM 22 is cleared, i.e., replaced with a (logical) ZERO.

If the transmission decision 23 lacks a data holding function, then the reading of cell data out of the arbitration RAM 22 must be interrupted. However, so long as the decision 23 has a data holding function, cell data can even be continuously read out of the RAM 22, depending on the capacity. The ATM cell transmission 4 adds an ATM header and other additional information to the ATM cell data read out of the buffer 3, thereby assembling and sending the ATM cell (7).

Figure 4:
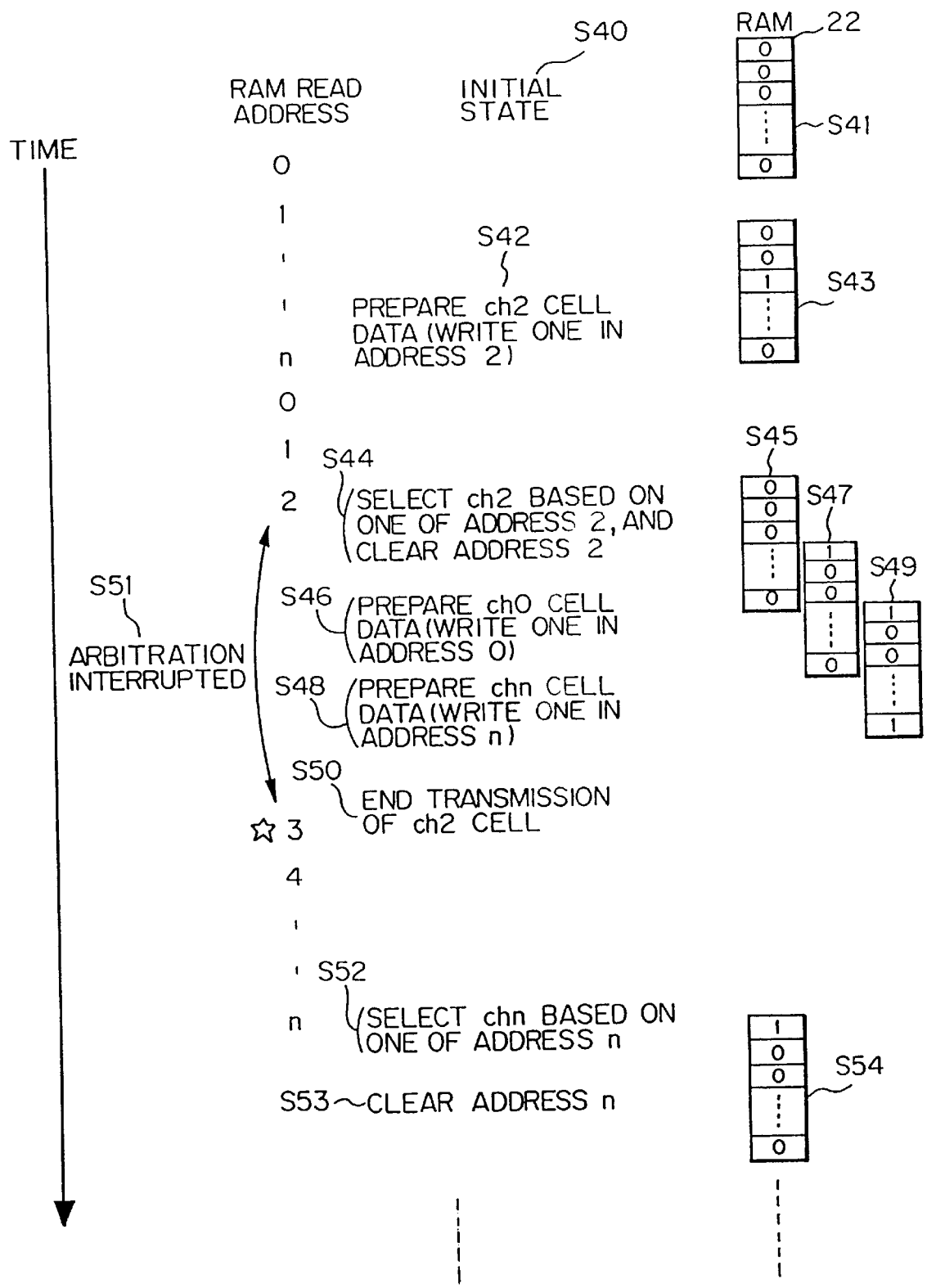
FIG. 4 demonstrates a specific operation of the arbitration circuit shown in FIG. 2.

FIG. 4 shows a specific procedure in which the arbitration 2 sequentially performs arbitration decision on the channels 2 and 0 in this order. As shown, in the initial condition (step S40), all the data D0 through Dn of the arbitration RAM 22 are ZEROs (step S41). The arbitration 2 prepares ATM cell data for, e.g., the channel ch2, i.e., writes a ONE in the RAM address 2 (steps S42 and S43).

Subsequently, the arbitration 2 determines, based on the ONE stored in the RAM read address 2, that the address 2 should be sent (step S44), and then clears (ZERO) the data of the RAM read address 2 (steps S44 and S45).

After the step S45, the arbitration 2 prepares ATM cell data for, e.g., the channel ch0 (step S46), i.e., writes a ONE in the RAM address 0 (steps S46 and S47). Next, the arbitration 2 prepares ATM cell data for the channel chn (step S48), i.e., writes a ONE in the RAM address n (steps S48 and S49). Then, the arbitration 2 ends the transmission of the ATM cell of the channel ch2 (step S50). During the interval between the processing of the address 2 to the processing of the address 3 (step S50), arbitration is interrupted (step S51).

Thereafter, the arbitration 2 determines, based on the ONE stored in the address n, that the channel chn should be sent (step S52). Then, the arbitration 2 clears (ZERO) the data of the address n (steps S53 and S54). It is to be noted that the arbitration interrupted up to the address 3 (step S50) should preferably be resumed at a suitable address matching with the system.

The illustrative embodiment described above is advantageous in that the arbitration RAM 22 makes it needless to fix the channel of input speech signals or data, and in addition allows channels to be added or omitted, as desired. It follows that an optimal ATM transmission order heretofore needed does not have to be taken into account. The embodiment is therefore directly applicable to various kinds of systems each dealing with particular input signals.

In the above embodiment, in the event when a plurality of channels of speeches or data are constructed into ATM cells and sent, one ATM cell of cell data is assembled and sent at a time. This kind of scheme is practicable when channel-by-channel speech signals or data are input substantially evenly so as not to assemble two or more cells at the same time.

Second Embodiment

Briefly, a second embodiment determines a particular order of ATM cell transmission by use of a RAM holding the amounts of assembled ATM cells and a memory holding the amounts of ATM cells to be sent.

Figure 5:
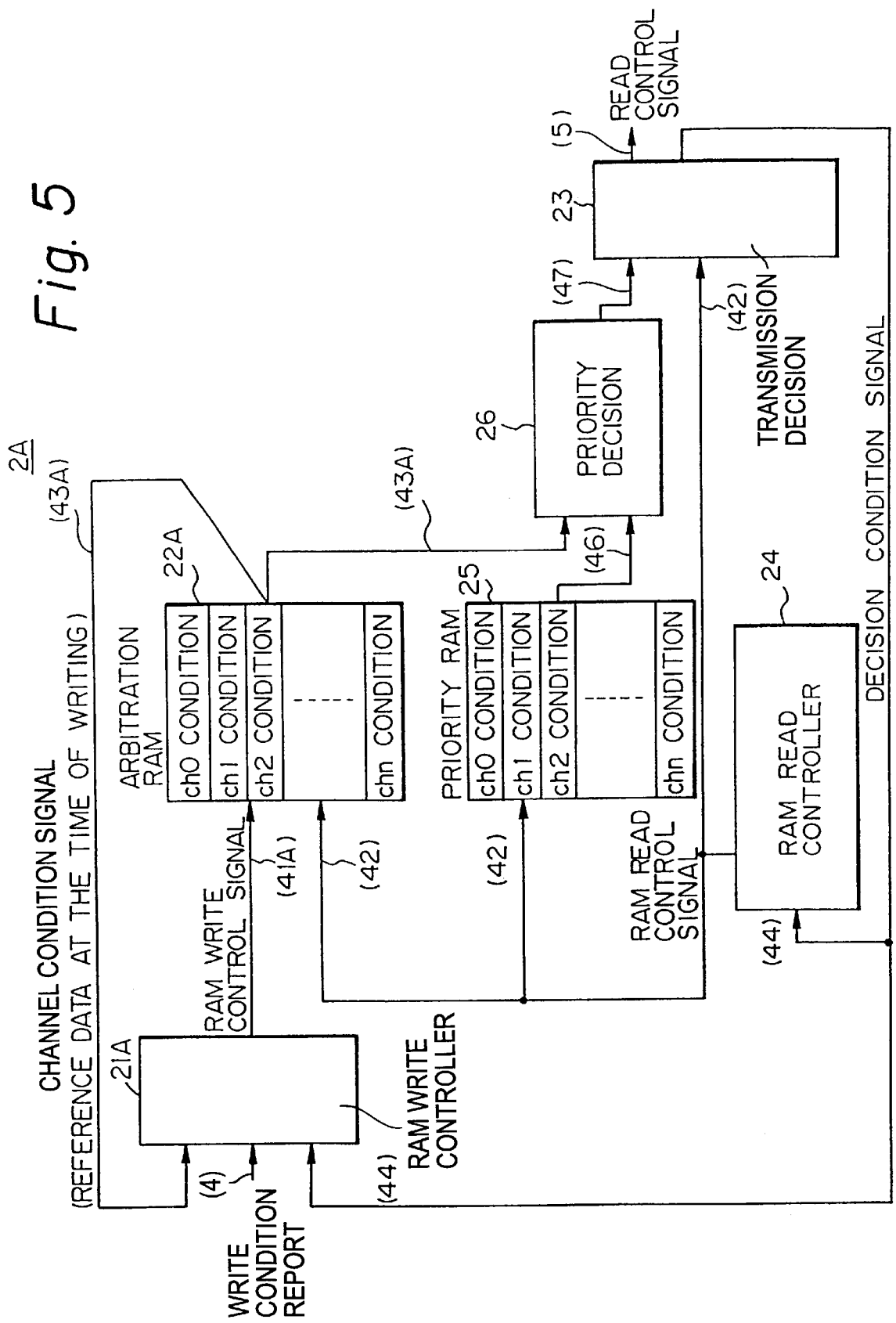
FIG. 5 is a block diagram schematically showing an arbitration circuit representative of a second embodiment of the present invention.

Referring to FIG. 5, an arbitration 2A representative of the second embodiment is shown and includes a RAM write controller 21A. The RAM write controller 21A controls the writing of the write condition report signal (4) in an arbitration RAM 22A with its RAM write control signal (41A), as in the first embodiment. In this embodiment, the RAM write controller 21A generates the control signal (41A) while taking account of reference data which occurred at the time of writing and output from the RAM 22A, i.e., a channel condition signal (43A).

The arbitration RAM 22A stores the RAM write control signal (41A) and outputs the channel condition signal (43A) designated by the RAM read control signal (42) received from the RAM read controller 24. In addition, the RAM 22A feeds to a priority decision 26, which will be described, a channel condition signal (43A) showing how many cells of ATM cell data of the designated channel are stored in the ATM cell assemblage buffer 3, FIG. 1. The channel condition signal (43A) is also fed to the RAM write controller 21A as the reference data which occurred at the time of writing.

A priority RAM 25 stores preselected channel-by-channel priority values corresponding one-to-one to the channels of the arbitration RAM 22A. A priority value (46) of any one of the channels is read out of the priority RAM 25 by the RAM read control signal (42) output from the RAM read controller 24.

The priority decision 26 receives the channel condition signal (43A) output from the arbitration RAM 22A and the priority value (46) output from the priority RAM 25. The priority decision 26 compares the channel condition signal (43A) with the priority value (46) of the same channel as the signal (43A). If the channel condition signal (43A) has a value greater than the priority value (46), the decision 26 delivers a channel condition signal (47) to the transmission decision 23 in order to select the above channel for a cell transmission channel.

Assume that the channel condition signal (43A) and RAM read control signal (42) indicate that ATM cell data is present in the ATM cell assemblage buffer 3. Then, the transmission decision 23 generates the read control signal (5) in order to select the channel of the cell data as a cell transmission channel, while outputting the decision condition signal (44) mentioned earlier.

The RAM read controller 24 functions in the same manner as described with reference to FIG. 2. In the illustrative embodiment, the RAM write controller 21A generates, based on the decision control signal (44), the write control signal (41A) for causing the arbitration RAM 22A to decrement by 1 (one) the channel condition signal (one of the ch0 condition through the chn condition) of the RAM 22A sent as a result of the transmission decision.

FIG. 6 shows the arbitration RAM 22A in detail. As shown, the RAM 22A has addresses 0 through n for storing the data D0 through Dn of the channels ch0 through chn, respectively. When any one of the data D0 through Dn has a value m, it shows that m ATM cells of cell data of the associated channel exist in the ATM cell assemblage buffer 3. For example, when the data D0 has a value "1", it shows that one ATM cell of cell data of the channel ch0 is stored in the buffer 3. When the data D0 has a value "2", it shows that two ATM cells of cell data of the channel ch0 are stored in the buffer 3. This is also true with the other data D1 through Dn.

FIG. 7 shows the priority RAM 25 in detail. As shown, the RAM 25 has addresses 0 through n for storing data (priority values) P0 through Pn relating to the channels ch0 through chn, respectively. A value m stored in any one of the data P0 through Pn shows that the ATM cell data of the associated channel stored in the ATM cell assemblage buffer 3 are valid if they are stored in m or greater number of ATM cells. For example, when the data P0 is "1", it shows that the ATM cell data of the channel ch0 are valid if they are stored in one or more ATM cells. When the data P0 is "2", it shows that the ATM cell data of the channel ch0 are valid if they are stored in two or more ATM cells. This is also true with the other data P1 through Pn.

More specifically, a particular priority value is set in each channel of the priority RAM 25 by initial setting. The write condition report signal (4) fed from the ATM cell assemblage 1, FIG. 1, is added to the value of the channel condition signal stored in the arbitration RAM 22A, thereby updating the channel condition signal. The channel conditions stored in the RAM 22A are read out either periodically or in accordance with the ATM cell transmission condition. At this instant, if any one of the channel condition signals of the RAM 22A shows that ATM cell data of the associated channel is present in the ATM cell assemblage buffer 3 and if the value of the ATM cell data is greater than the data P of the same channel stored in the priority RAM 25, then such a channel is selected for an ATM cell transmission channel. Therefore, the arbitration 2A outputs the read control signal (5) meant for the buffer 3 in order to send the ATM cell data of the above channel. Thereafter, the channel condition signal of the RAM 22A sent as a result of the transmission decision is decremented by 1.

The operation of the second embodiment will be described with reference also made to FIG. 1. The ATM cell assemblage 1 separates the multiplexed or parallel speech signals or data (1) channel by channel and writes the resulting channel-by-channel speech signals or data in the ATM cell assemblage buffer 3. At this instant, the assemblage 1 recognizes whether or not it has written some data in the buffer 3 channel by channel. The assemblage 1 feeds to the arbitration 2A the write condition report signal (4) showing the channels each storing one ATM cell of cell data.

In response to the write condition report signal (4), the arbitration 2A feeds the RAM write control signal (41A) to the arbitration RAM 22A in order to increment the data D of the corresponding channel by 1. Priority values matching with the system are stored in the priority RAM 25 beforehand, as stated earlier. The data stored in the arbitration RAM 22A and priority RAM 25 are read out by the RAM read control signal (42) output from the RAM read controller 24.

Assume that the priority decision 26 determines that the value of the data D (channel condition signal) read out of the arbitration RAM 22A is greater than the data (priority value) P read out of the priority RAM 25. Then, the decision 23 outputs the read control signal (5) in order to cause the ATM cell data of the channel associated with the above data D to be read out of the buffer 3.

Further, the transmission decision 23 delivers the decision condition signal (44) to the RAM write controller 21A and RAM read controller 24, informing them of the channel to effect ATM cell transmission. In response, the RAM write controller 21A feeds the RAM write control signal (41A) to the arbitration RAM 22A in order to decrement the data (channel condition signal) of the above channel stored in the RAM 22A by 1. If the transmission decision 23 lacks a data holding function, then the read-out from the arbitration RAM 22A must be interrupted. However, so long as the decision 23 has a data holding function, data can even be continuously read out of the RAM 22A, depending on the capacity. The ATM cell transmission 4 adds an ATM header and other information to the ATM cell data read out of the buffer 3, thereby assembling the ATM cell (7).

Figure 8:
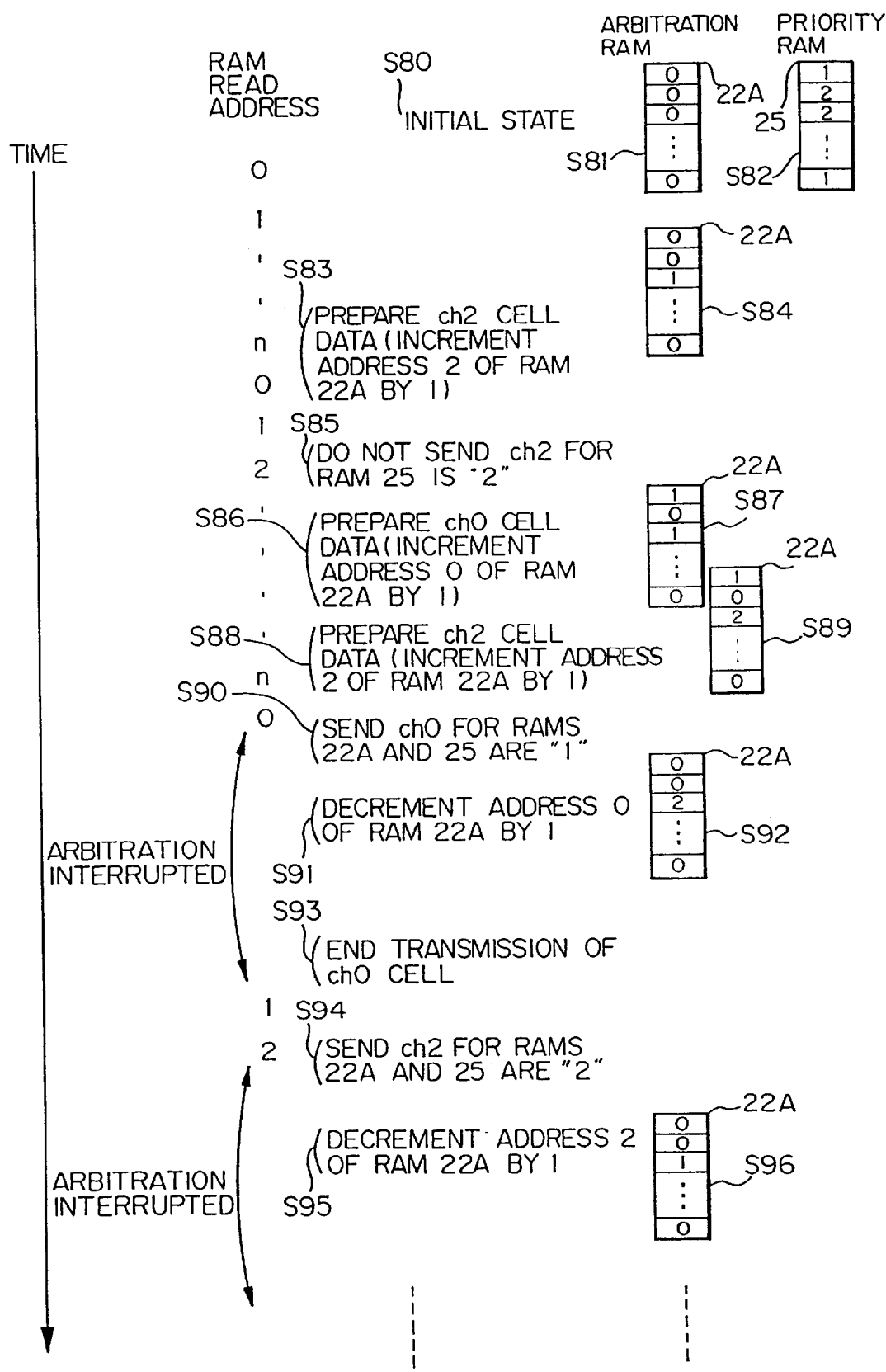
FIG. 8 demonstrates a specific operation of the second embodiment.

Reference will be made to FIG. 8 for describing a specific procedure in which the arbitration 2A sequentially performs arbitration decision on the channels ch2 and ch0 in this order. In the initial stage (step S80), all the data stored in the arbitration RAM 22A are ZEROs (step S81). In the priority RAM 25, "1" is stored in the channel ch0 of the address 0 as data (priority value) P0 while "2" is stored in the channels ch1 through chn-1 of the addresses 1 through n-1 as data (priority values) P1 through Pn-1.

In addition, "1" is stored in the channel chn of the address n of the RAM 25 as data (priority value) Pn. This condition of the RAM 25 is represented by a step S82.

First, the arbitration 2A prepares ATM cell data for the channel ch2 (step S83). Specifically, the arbitration 2A increments the data stored in the address 2 of the arbitration RAM 22A by 1 (steps S83 and S84). While the resulting data of the address 2 of the arbitration RAM 22A is "1", the data (priority value) P2 stored in the address 2 of the priority RAM 25 is "2". As a result, the arbitration 2A determines that the channel ch2 should not be sent (step S85).

Next, the arbitration 2A prepares ATM cell data for the channel ch0 (step S86). Specifically, the arbitration 2A increments the data stored in the address 0 of the RAM 22A by 1 (steps S86 and S87). Then, the arbitration 2A prepares cell data for the channel ch2 (step S88). Specifically, the arbitration increments the data stored in the address 2 of the RAM 22A by 1 (steps S88 and S89). Because the data stored in the address 0 (channel ch0) of the arbitration RAM 22A is "1" and because the data (priority value) P0 of the channel stored in the priority RAM 25 is "1", the arbitration 2A, i.e., the priority decision 26 and transmission decision 23 determine that the channel ch0 should be sent (step S90).

After the step S90, the arbitration 2A decrements the data stored in the address 0 (channel ch0) of the arbitration RAM 22A by 1 (steps S91 and S92). Then, the transmission of the ATM cell of the channel ch0 ends (step S93). During the steps S90 through S93, the arbitration 2A does not perform arbitration.

Subsequently, because the data stored in the address 2 (channel ch2) of the arbitration RAM 22A is "2" and because the data (priority value) P2 of the channel ch2 stored in the priority RAM 26 is "2", the priority decision 26 and transmission decision 23 determine that the channel ch2 should be sent (step S94). Then, the arbitration 2A decrements the data stored in the address 2 (channel ch2) of the RAM 22A by 1 (steps S95 and S96). The arbitration 2A does not perform arbitration at the step S94 and successive steps. After the interruption of arbitration, the reading of the arbitration RAM 22A and priority RAM 25 may be resumed at any suitable address matching with the system.

As stated above, the arbitration RAM 22A and priority RAM 25 included in the embodiment make it needless to fix the channel allocation to the input speech signals or data (1), and in addition allow channels to be added or omitted, as desired. It follows an optimal ATM transmission order heretofore needed does not have to be taken into account. The embodiment is therefore directly applicable to various systems each dealing with particular input signals.

Assume that a bit rate noticeably differs from one channel to another channel to which input speeches or data are allocated. Then, the illustrative embodiment allows the data (priority values) P0 through Pn of the channels ch0 through chn to be set in the priority RAM 25 at the time of initial setting, so that data can be read out of the ATM cell assemblage buffer 3 in accordance with the preselected priority order. This successfully reduces the difference between the amounts of channel-by-channel data stored in the buffer 3 and thereby reduces the overflow of the buffer 3. In addition, the required capacity of the buffer 3 can be reduced.

In the above embodiment, ATM cell transmission is effected with a channel reaching a preselected amount of assembled ATM cell data. So long as a buffer for storing ATM cell data has a capacity sufficiently greater than the preselected amount of assembled ATM cell data, this embodiment is practicable without regard to the frequency of occurrence of input speech or data. Even when the buffer does not have such a capacity, the embodiment is practicable if the probability of occurrence of channel-by-channel speech signals and data is limited.

Third Embodiment

A third embodiment to be described selects a particular order of ATM cell transmission by use of a FIFO memory sequentially storing channels on which ATM cells have been fully assembled.

Figure 9:
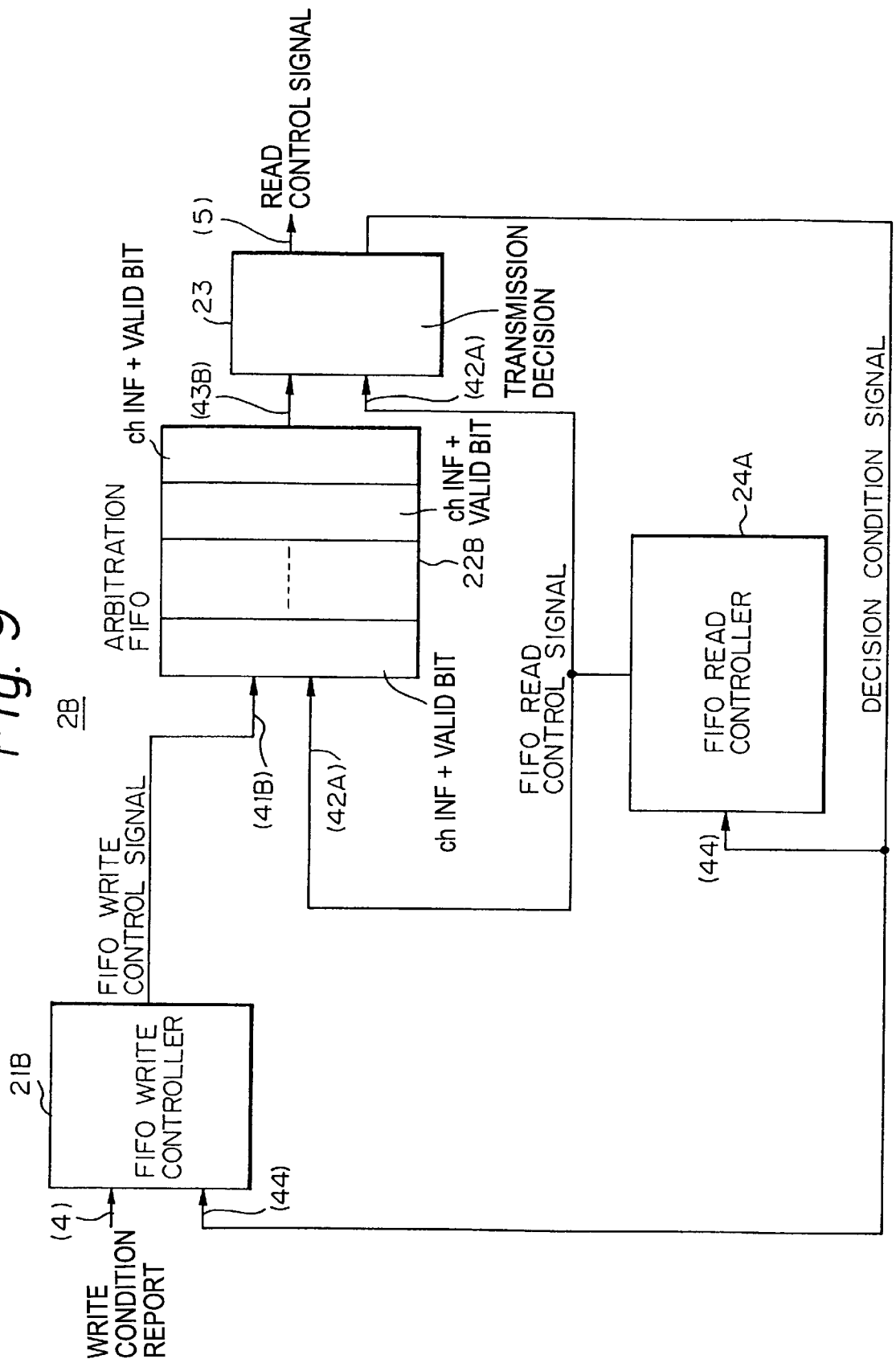
FIG. 9 is a block diagram showing an arbitration circuit representative of a third embodiment of the present invention.

Referring to FIG. 9, an arbitration 2B representative of this embodiment is made up of a FIFO write controller 21B, an arbitration FIFO 22B and a FIFO read controller 24A in addition to the transmission decision 23. The FIFO write controller 21B receives the write condition report signal (4) from the ATM cell assemblage 1, FIG. 1, and generates a FIFO control signal (41B) for writing the signal (4) in the arbitration FIFO 22B. The FIFO 22B sequentially stores the write condition report signals (4) in the order of receipt. The FIFO read controller 24A feeds a FIFO read control signal (42A). In response to this signal (42A), the FIFO 22B outputs (channel information+valid bit) signals (43B) either periodically or in accordance with the ATM cell transmission condition. That is, on receiving the signal (42A), the FIFO 22B outputs the data in the same order as it has stored them.

In this embodiment, the transmission decision 23 also receives the FIFO read control signal (42A) from the FIFO read controller 24A. In response, the decision 23 determines whether or not a valid bit included in the (channel information+valid bit) signal (43B) is valid. If the valid bit signal is valid, the decision 23 selects the channel represented by the signal (43B) for an ATM cell transmission channel and outputs the read control signal (5) and decision condition signal (44). The FIFO read controller 24A outputs the FIFO read control signal (42A) in accordance with the decision condition signal (44).

The write condition report signals (4) stored in the arbitration FIFO 22B are read out either periodically or in accordance with the ATM cell transmission condition, as stated earlier. At this instant, if the valid bit included in the (channel information+valid bit) signal (43B) is valid, the channel represented by the signal (43B) is selected for an ATM cell transmission channel. The arbitration 2B outputs the read control signal (5) meant for the ATM cell assemblage buffer 3, FIG. 1, in order to send the ATM cell data of the above channel.

Figure 10:
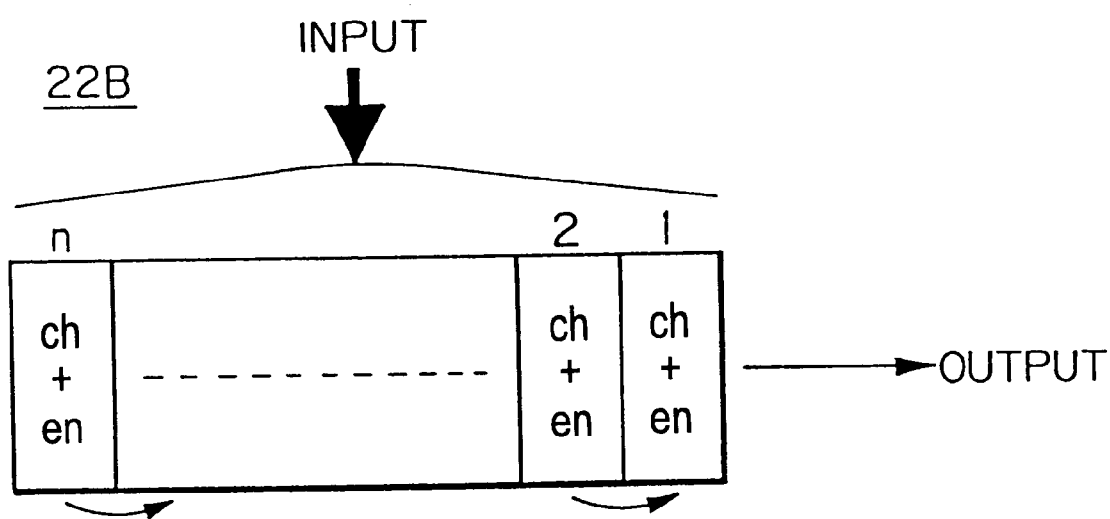
FIG. 10 shows an arbitration FIFO (First-In First-Out) memory included in the third embodiment.

FIG. 10 shows the arbitration FIFO 22B in detail. As shown, when channel information ch included in the (channel ch+valid bit en) signal (43B) is "0", it shows that one ATM cell of cell data of the channel ch0 is stored in the ATM cell assemblage buffer 3. When the channel information ch is "1" it shows that one ATM cell of cell data of the channel ch1 is stored in the buffer 3. In this manner, when the channel information ch has a value m, it shows that one ATM cell of cell data of the channel chm is stored in the buffer 3.

When the valid bit en is a ZERO, it shows that the value of the channel associated therewith is invalid. More specifically, the valid bit en becomes "0" when all the FIFO data are read out. When the valid bit en is a ONE, it shows that the value of the associated channel is valid.

In operation, on receiving the write condition report signal (4) from the ATM cell assemblage 1, the arbitration 2B writes a channel designated by the signal (4) in the arbitration FIFO 22B while writing a ONE as a valid bit. The FIFO 22B reads out the (channel information ch+valid bit en) signal (43B) in response to the FIFO read control signal (42A) received from the FIFO read controller 24A. When the valid bit en of the signal (43B) is a ONE, the transmission decision 23 feeds the read control signal (5) to the ATM cell assemblage buffer 3 so as to read the ATM cell data of the above channel out of the buffer 3.

The transmission decision 23 delivers the decision condition signal (44) to the FIFO read controller 24A and FIFO write controller 21B, informing them of the channel whose ATM cell is to be sent. The arbitration FIFO 22B shifts the data existing therein. So long as the transmission decision 23 has a data holding function, the ATM cell data (6) can be continuously read out of the ATM cell assemblage buffer 3 in accordance with the capacity of the decision 23. The ATM cell transmission 4 adds an ATM header and other information to the cell data (6) read out of the buffer 3 and outputs the resulting ATM cell (7).

Figure 11:
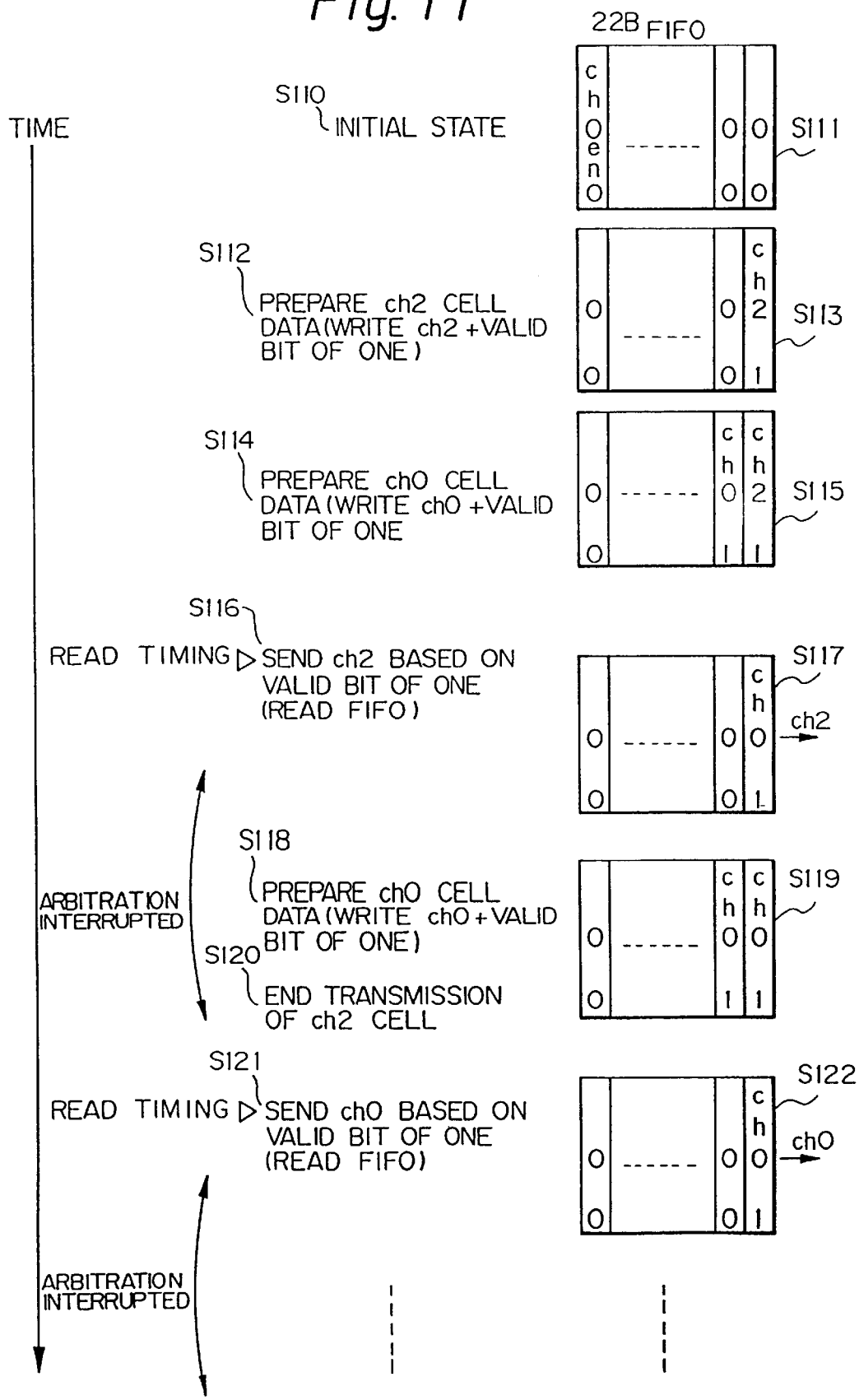
FIG. 11 shows a specific operation of the third embodiment.

FIG. 11 shows a specific procedure in which the arbitration 2B sequentially performs arbitration decision on the channels ch2 and ch0 in this order. In the initial condition (step S110), no data are stored in the (channel information ch+valid bit en) signals (43B) of the arbitration FIFO 22B (step S111). The arbitration 2B prepares ATM cell data for the channel ch2 (step S112), i.e., writes the channel ch2 and valid bit of ONE in the FIFO 22B (steps S112 and S113).

Next, the arbitration 2B prepares ATM cell data for the channel ch0 (step S114), i.e., writes the channel ch0 and valid bit of ONE in the FIFO 22B (steps S114 and S115). Because the valid bit of the channel ch2 is a ONE, the arbitration 2B performs transmission decision on the channel ch2 and reads, at a read timing, the data out of the FIFO 22B (steps S116 and S117). Subsequently, the arbitration 2B prepares ATM cell data for the channel ch0 (step S118), i.e., writes the channel ch0 and valid bit of ONE in the FIFO 22B (steps S118 and S119). Then, the arbitration 2B ends the transmission of the ATM cell of the channel ch2 (step S120).

After the step S120, the arbitration 2B performs transmission decision on the channel ch0 because the valid bit of the channel ch0 has become a ONE. At a read timing, the arbitration 22B reads out the data out of the FIFO 22B (steps S121 and S122). Arbitration is interrupted from the steps S116 to the step S121.

As stated above, the arbitration FIFO 22B included in the third embodiment makes it needless to fix the channels of input speech signals or data, and in addition allow channels to be added or omitted, as desired. It follows that an optimal ATM transmission order heretofore needed does not have to be taken into account. The embodiment is therefore directly applicable to various systems each dealing with particular input signals.

Again, assume that a bit rate noticeably differs from one channel to another channel to which input speech signals or data are allocated. Then, the illustrative embodiment sequentially sends the ATM cells of the channels in the order in which the cells are assembled. This successfully reduces the difference between the amounts of channel-by-channel data stored in the buffer 3 and thereby reduces the overflow of the buffer 3. In addition, the required capacity of the buffer 3 can be reduced.

Moreover, the embodiment enhances rapid processing because the arbitration 2B simply deals with the valid bits during arbitration.

In the third embodiment, ATM cells are sequentially sent in the same order as they are assembled on the channels. So long as the memory for holding the channels on each of which one cell of ATM cell data has been assembled has a sufficient capacity, the embodiment is practicable without regard to the frequency of occurrence of the channel-by-channel input speeches or data. Even when the memory does not have such a capacity, the embodiment is practicable if the rate of occurrence of input speeches or data, i.e., the rate at which one cell of ATM cell data is fully assembled is limited.

Fourth Embodiment

A fourth embodiment to be described determines a particular order of ATM cell transmission by use of a register holding the amounts of assembled ATM cells.

Figure 12:
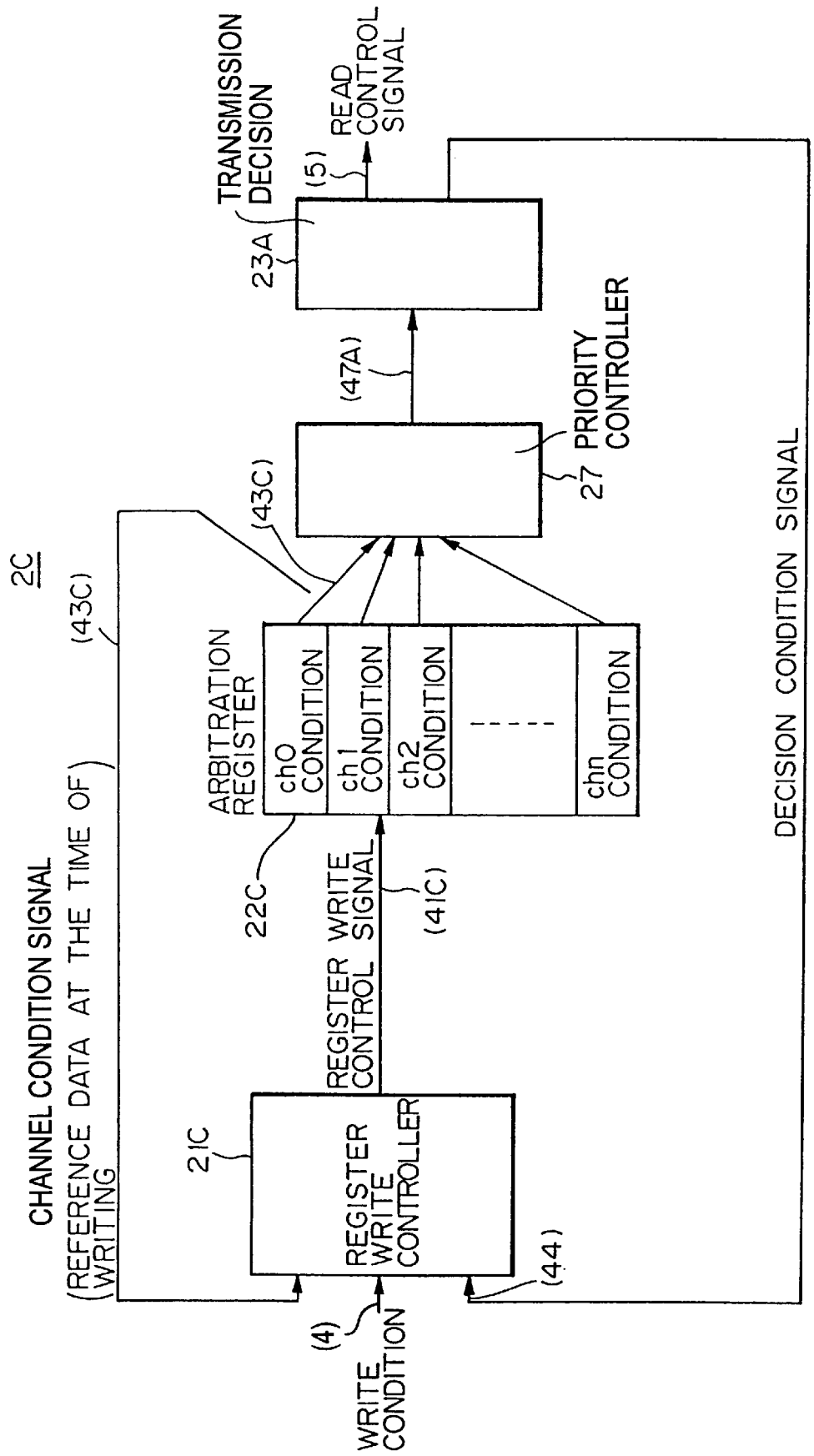
FIG. 12 is a block diagram schematically showing an arbitration circuit representative of a fourth embodiment of the present invention.

Referring to FIG. 12, an arbitration 2C representative of the fourth embodiment includes a register write controller 21C and an arbitration register 22C. On receiving the write condition report signal (4) output from the ATM cell assemblage 1, FIG. 1, the register write controller 21C outputs it in the form of a register write control signal (41C), taking account of reference data (channel condition signal) (43C) which occurred at the time of writing and received from the arbitration register 22C.

The arbitration register 22C stores the register write control signals (41C) as channel condition signals (43C) channel by channel, and outputs them either periodically or in accordance with the ATM cell transmission condition. A priority controller 27 searches the arbitration register 22C by using the greatest value of the channel condition signals (43)C of the channels ch0 through channel chn as a priority value. Then, the priority controller 27 outputs channel information (47A) representative of a channel equal to or exceeding the priority value.

A transmission decision 23A determines, based on the channel information (47A), a channel for transmitting an ATM cell and outputs the read control signal (5). At the same time, the decision 23A outputs the decision condition signal (44) and feeds it to the register writer controller 21C. The register write controller 21C feeds the register write control signal (41C) to the arbitration register 22C in order to decrement a register included in the register 22C and assigned to the channel designated by the signal (41C).

The write condition report signal (4) received from the ATM cell assemblage 1 is transferred to the arbitration register 22C via the register write controller 21C. The signal (4) is added to data of the associated channel existing in the register 22C, as will be described specifically later. Data stored in the register 22C are read out either periodically or in accordance with the ATM cell transmission condition. At this instant, the priority controller 27 searches the register 22C by using the greatest value of all the channels of the register 22C as a priority value, as mentioned earlier. The channel having a value equal to or greater than the priority value is selected for an ATM cell transmission channel. As a result, the transmission decision 23A outputs the read control signal (5) for causing the ATM cell data of the above channel to be read out of the ATM cell assemblage buffer 3, FIG. 1. Subsequently, the register write controller 21C decrements by 1 the register of the register 22C assigned to the channel sent as a result of the transmission decision.

The arbitration register 22C is similar in construction to the arbitration RAM 22A, FIG. 6, except that it is a register. Specifically, the register 22C has addresses 0 through n to to which the channels ch0 through chn are respectively assigned. Data D0 through Dn are temporarily held in the channels ch0 through chn, respectively. When any one of the data D0 through Dn has a value m, it shows that m ATM cells of cell data of the associated channel are stored in the ATM cell assemblage buffer 3. For example, when the data D0 is "1", it shows that one ATM cell of cell data of the channel ch0 is held in the buffer 3. When the data D0 is "2", it shows that two ATM cells of cell data of the channel ch0 are held in the buffer 3. This is also true with the other data D1 through Dn.

In operation, the arbitration 2C receives the write condition report signal (4) from the ATM cell assemblage 1. In response, the arbitration 2C causes the register write controller 21 C to increment data of the channel designated by the signal (4) (channel condition signal) and stored in the arbitration register 22C by 1. The priority controller 27 constantly monitors the channel-by-channel data existing in the arbitration register 22C in order to see the greatest one of such data. At the same time, a counter, not shown, built in the priority controller 27 searches the data of the register 22C channel by channel. The priority controller 27 compares the greatest value and the channel-by-channel values. If any one of the channel-by-channel values is equal to or greater than the greatest value, the priority controller 27 causes the transmission decision 23A to output the read control signal (5). As a result, the ATM cell data of the channel designated by the signal (5) is output from the ATM cell assemblage buffer 3.

The transmission decision 23A informs the register write controller 21 C of the channel whose ATM cell is to be sent by feeding the decision condition signal (44). In response, the register write controller 21C decrements by 1 the data of the channel represented by the signal (44) and stored in the arbitration register 22C (channel condition signal). If the transmission decision 23A lacks a data holding function, then the channel-by-channel data search of the register 22C must be interrupted. However, so long as the decision 23A has a data holding function, the data can be continuously read out, depending on the capacity of the decision 23A.

Figure 13:
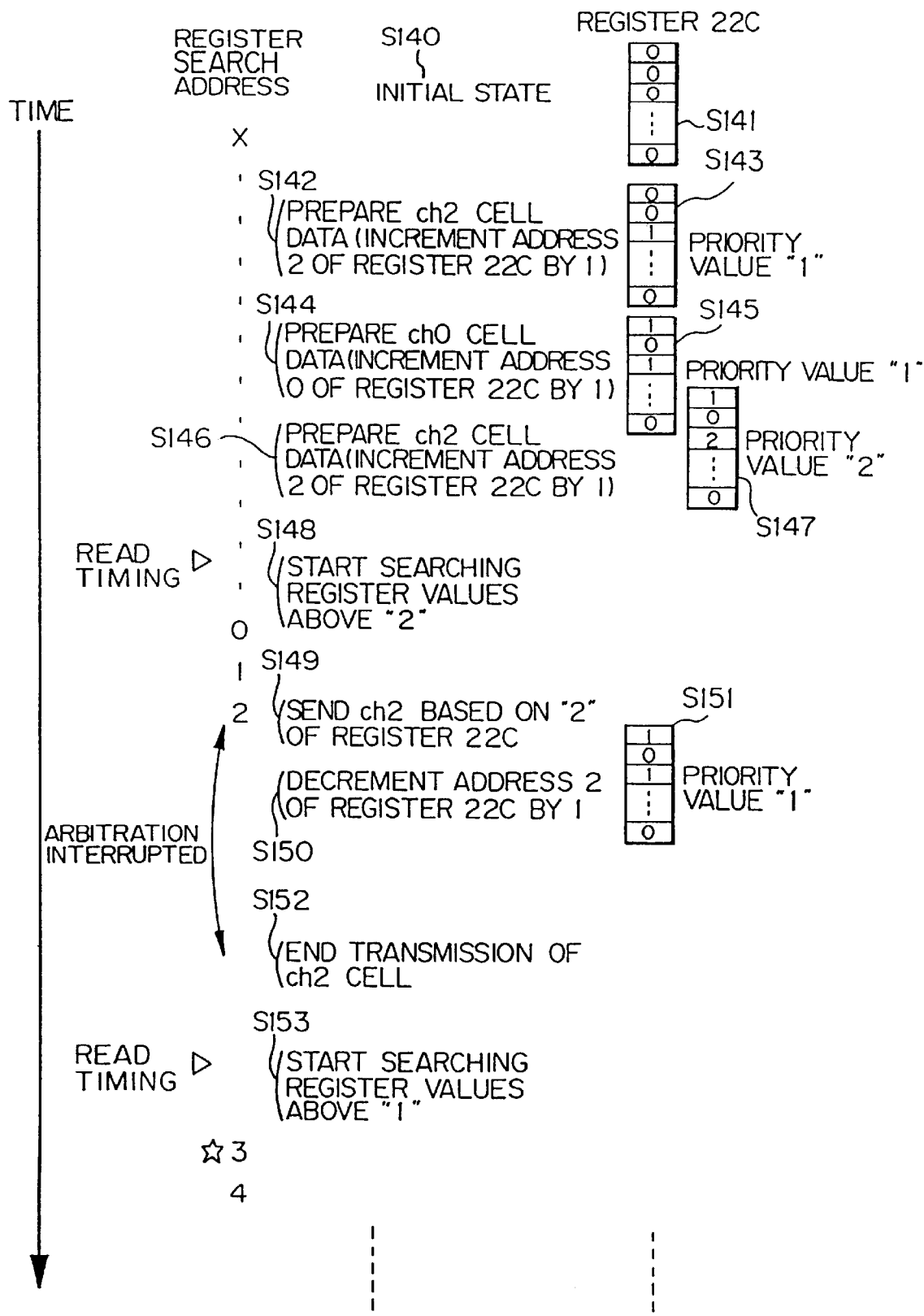
FIG. 13 shows a specific operation of the fourth embodiment.

FIG. 13 shows a specific procedure in which the arbitration 2C sequentially performs arbitration decision on the channels ch2 and ch0 in this order. In the initial condition (step S 140), all the channel-by-channel data of the arbitration register 22C (channel condition signals) are "0" (step S141). The arbitration 2C prepares ATM cell data for the channel ch2 (step S142), i.e., increments the address or channel 2 of the register 22C by 1 (steps S142 and S143). At this time, the priority value is "1".

Next, the arbitration 2C prepares ATM cell data for the channel ch0 (step S144), i.e., increments the address or channel 0 of the register 22C by 1 (steps S144 and S145). Subsequently, the arbitration 2C prepares ATM cell data for the channel ch2 (step S146), i.e., increments the address or channel 2 of the register 22C by 1 (steps S146 and 147). As a result, the priority value increases to "2". Then, the arbitration 2C causes the priority controller 27 to search two or more of the channels of the register 22C (step S148).

The arbitration 2C determines, based on the value "2" of the address 2 of the register 22C, that the channel 2 should be sent (step S149). Then, the arbitration 2C decrements the data value "2" of the address 2 (channel condition signal) of the register 22C (steps S150 and S151). As a result, the priority value decreases to "1".

After ending the transmission of the channel 2 (step S152), the arbitration 2C searches the channels of the register 22C whose values (channel condition signals) are "1" or above (step S153). The arbitration is interrupted from the step S149 to the step S153. After this interruption, the reading of the register 22C may be resumed at any desired address matching with the system.

As stated above, the arbitration register 22C included in the fourth embodiment makes it needless to fix the channels of input speech signals and data, and in addition allow channels to be added or omitted, as desired. It follows that an optimal ATM transmission order heretofore needed does not have to be taken into account. The embodiment is therefore directly applicable to various systems each dealing with particular input signals.

Particularly, the priority controller 27 monitors all the channel-by-channel data (channel condition signals) of the arbitration register 22C. Therefore, when no ATM cells occur, e.g., when the priority value is "0", the arbitration 2C does not have to perform the searching operation, reducing power consumption.

In the fourth embodiment, ATM cells are sequentially sent in the decrementing order as to the channel-by-channel amount of ATM cell data assembled. This procedure is practicable when a plurality of channels of ATM cell data are assembled almost at the same time and can be sent in any order.

Fifth Embodiment

A fifth embodiment to be described selects a particular order of ATM cell transmission by use of a register holding the amounts of assembled ATM cells, circuitry monitoring the register on a block basis, and a memory giving a particular degree of priority to each block.

Figure 14:
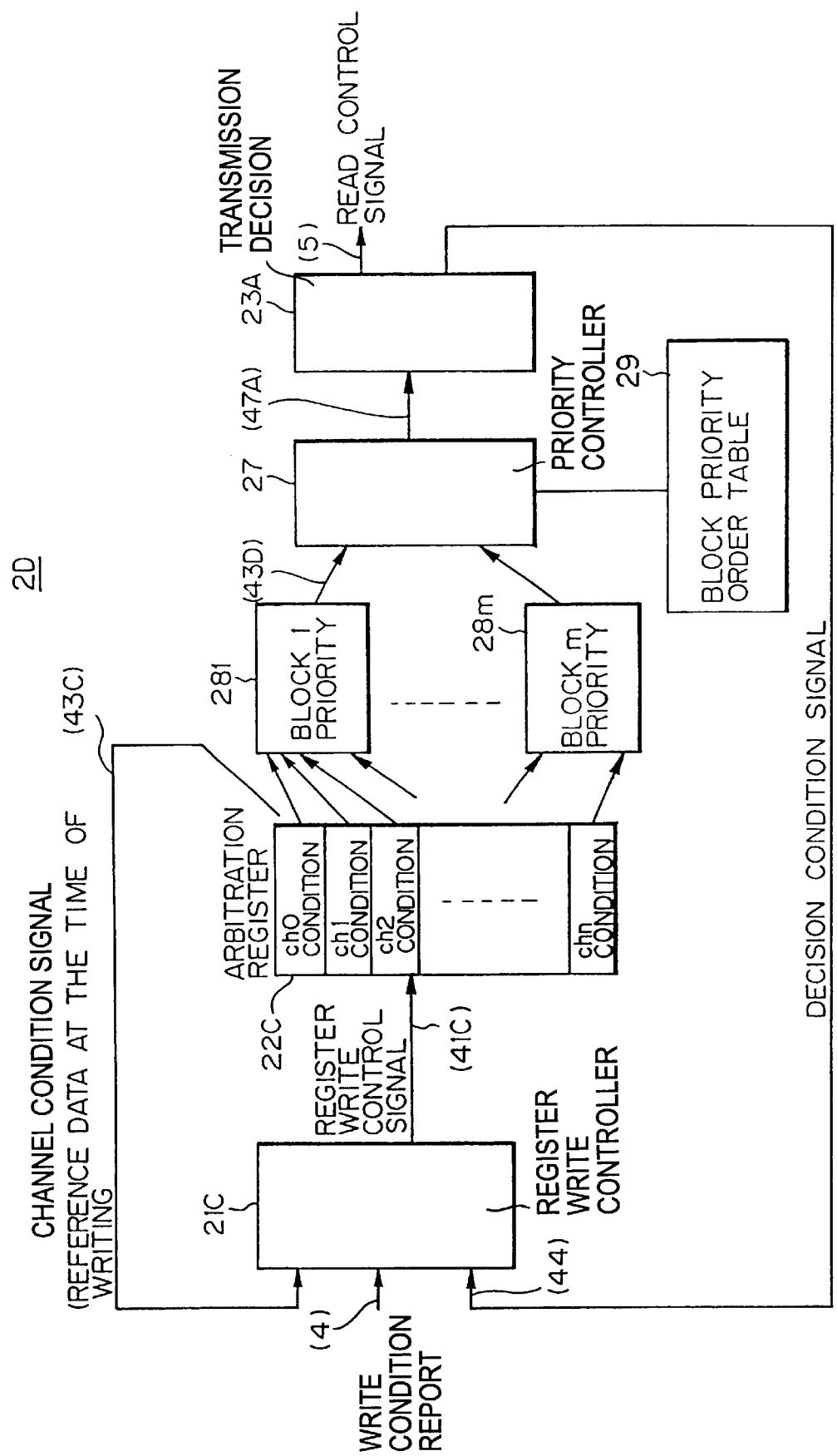
FIG. 14 is a block diagram schematically showing an arbitration circuit representative of a fifth embodiment of the present invention.

Referring to FIG. 14, an arbitration 2D representative of the fifth embodiment, like the arbitration 2C, includes the register write controller 21C, arbitration register 22C, priority controller 27, and transmission decision 23A. The arbitration 2D additionally includes a block 1 priority 281 through a block in priority 28m intervening between the register 22C and the priority controller 27. The block 1 priority 281 monitors the data (43C) of, e.g., the addresses or channels 0 through 2 (channel condition signals), i.e., one block of data. Likewise, the block m priority 28m monitors one block of data consisting of, e.g., the addresses n-2 through n. The block 1 priority 281 through the block m priority circuit 28m each outputs the greatest data value or priority value (43D).

In this embodiment, the priority controller 27 searches for the greatest one of the priority values output from the block 1 priority 281 through the block m priority 28m, and outputs corresponding channel information (47A). A block priority order table 29 lists a preselected priority order assigned to the priorities 281 through 28m beforehand. When the priority values output from the priorities 281 through 28m are identical, the priority controller 27 references the block priority order table 29 in order to output channel information (47A) representative of the greatest priority value of the block given a higher degree of priority.

The operation of the arbitration 2D will be outlined. When the write condition report signal (4) is fed from the ATM cell assemblage 1 to the arbitration 2D, it is added to the value of the associated one of the registers constituting the arbitration register 22C. The values of the registers of the arbitration register 22C are read out either periodically or in accordance with the ATM cell transmission condition. The block 1 priority 281 through the block m priority 28m each searches the block of channels of the register 22C assigned thereto by using the greatest value of those channels as a priority value. The priority controller 27 selects the channel of the register 22C corresponding to the block having a higher degree of priority. When the higher degree of priority exceeds a priority value set in the priority controller 27 beforehand, the controller 27 selects the information (47A) of that channel for an ATM cell transmission channel. The transmission decision 23A outputs the read control signal (5) for reading the ATM cell data of the above channel out of the ATM cell assemblage buffer 3. If the priority values of the blocks are the same, the priority controller 27 selects the channel of the block having a higher degree of priority by referencing the block priority order table 29. The data corresponding to the channel sent as a result of the transmission decision and stored in the register 22C is decremented by 1.

Specifically, on receiving the write condition report signal (4) from the ATM cell assemblage 1, the arbitration 2D increments the data of the channel designated by the signal (4) and stored in the arbitration register 22C by 1. Each of the block 1 priority 281 through the block m priority 28m monitors the priority values of the block assigned thereto.

The priority controller 27 searches for the greatest priority value of the block given a higher degree of priority while referencing, if necessary, the block priority order table 29. Subsequently, the controller 27 compares the values of the data belonging to the above block and searched by a counter built in the priority controller 27 and the greatest value of the data of the register 22C. When the data value stored in the address (channel) of the register 22C being searched is greater than the greatest value, the controller 27 causes the transmission decision 23A to output the read control data (5) for reading the ATM cell data of such a channel out of the buffer 3.

The transmission decision delivers the decision condition signal (44) to the register write controller 21C in order to inform it of the channel selected. The data of this channel stored in the register 2C is decremented by 1. If the transmission decision 23A lacks a data holding function, the search of the register 22C must be interrupted. However, if the decision 23A has a data holding function, the read control signal (5) can be continuously output, depending on the capacity of the decision 23A.

Figure 15:
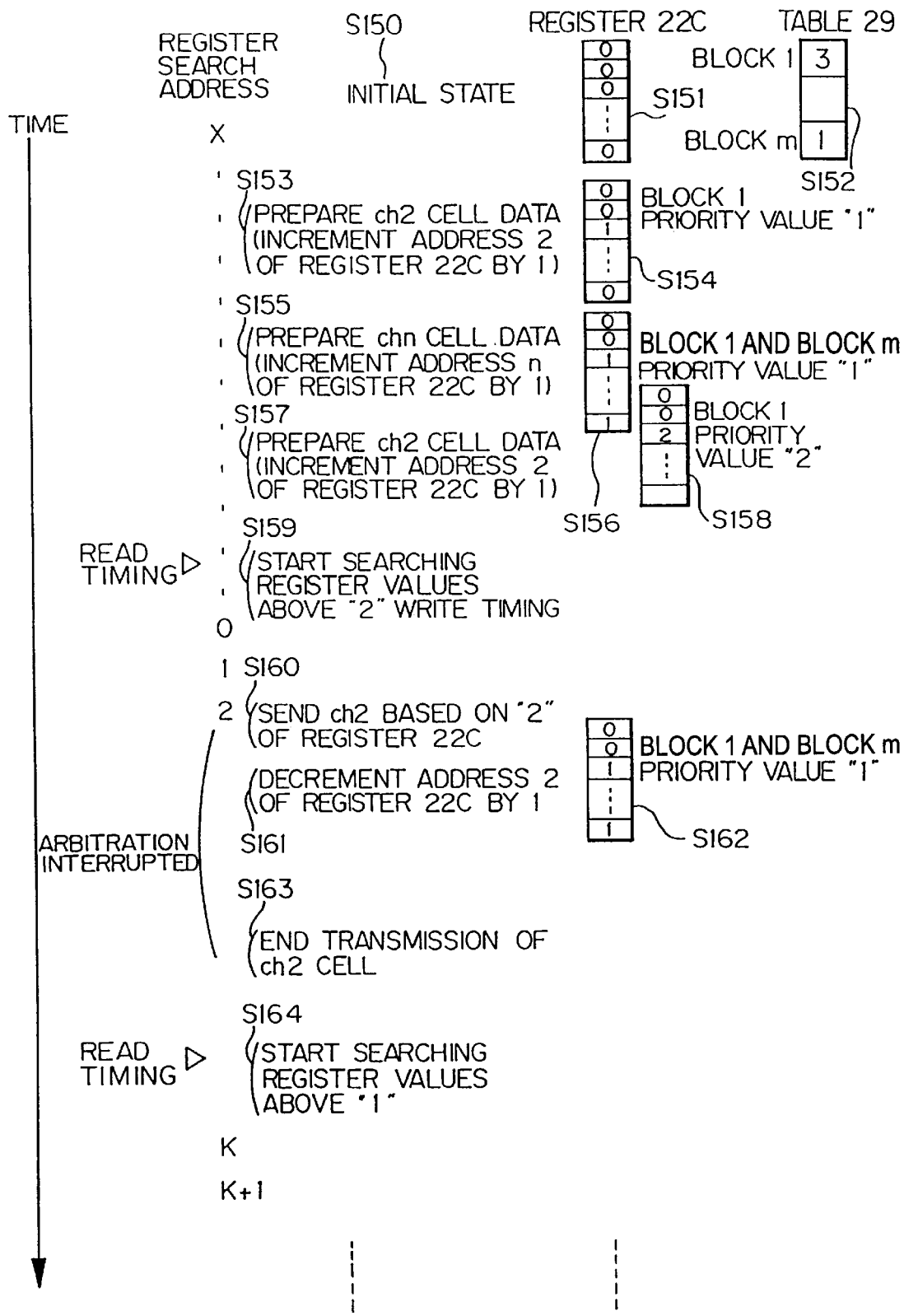
FIG. 15 demonstrates a specific operation of the fifth embodiment.

FIG. 15 shows a specific procedure in which the arbitration 2D sequentially performs arbitration decision on the channels ch2 and ch0 in this order. As shown, in the initial stage (step S150), all the data in the arbitration register 22C are "0" (step 151). In the block priority order table 29, priority orders "3" and "1" are given to the blocks 1 and m, respectively (step S152).

In the above condition, the arbitration 2D prepares ATM cell data for the channel ch2 (step S153), i.e., increments the address 2 of the arbitration register 22C by 1 (steps S153 and S154). At this time, the priority value of the block 1 priority 281 is "1". Next, the arbitration 2D prepares ATM cell data for the channel chn (step S155), increments the address n of the register 22C by 1 (steps S155 and S156). Therefore, the priority value of the block 1 priority 281 and that of the block m priority 28m both are "1".

Subsequently, the arbitration 2D prepares ATM cell data for the channel 2 (step S157), i.e., increments the address 2 of the register 22C by 1 (steps S157 and S158). As a result, the priority value of the block 1 priority 281 increases to "2". Because the priority value of the block 1 priority 281 is "2", the arbitration 2D searches for the channels of the register 22C accommodated in the block 1 priority 281 and having values of "2" or above (step S159). At this instant, the arbitration 2D determines that the address 2 of the register 22C is "2", and that the channel ch2 should be sent (step S160).

After the step S160, the arbitration 2D decrements the data stored in the address 2 of the register 22C by 1 (steps S161 and S162), and then ends the transmission of the ATM cell of the channel ch2. Because the resulting data of the address 2 of the block 1 priority 281 is "1" and because the data existing at the address m of the block m priority 28m is also "1", the arbitration 2D searches for the addresses (channels) of the block m priority 28m whose priority values are "1" or above on the basis of the block priority order table 29 (step S164). From the step S16 to the step S164, the arbitration 2D does not perform arbitration. After the interruption of the arbitration, the arbitration 2D again starts reading the register 22C at a suitable address of the individual block matching with the system.

The fifth embodiment achieves the following advantage in addition to the advantages described in relation to the fourth embodiment. With the block 1 priority 281 through the block m priority 28m and block priority order table 29, the arbitration 2D is capable of searching the arbitration register 22C block by block. This successfully reduces the searching time and thereby increases the overall processing speed while reducing power consumption.

In the above embodiment, in the event when a plurality of channels of speech signals or data are constructed into ATM cells and sent, the channel having a greater amount of ATM cell data assembled and having a higher degree of priority is sent first. This embodiment is similar to the fourth embodiment except that it gives a particular degree of priority to each block of channels. However, this embodiment enhances rapid arbitration even if all the channels are given the same degree of priority.

In summary, in accordance with the present invention each of, a plurality of channels of input signals each each is decomposed into unit data necessary for forming a cell and then written to storing means. The condition in which the channel-by-channel data are stored in the storing means is monitored. A read command matching with the above condition is fed to the storing means. It is therefore possible to execute rapid processing in accordance with the frequency and amount of the input signal of the individual channel as well as a preselected priority order. This can be done even when the channel configuration is changed. As a result, cells can be efficiently assembled by a simple construction.

The entire disclosure of Japanese patent application No. 24636/1997 filed on Feb. 7, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present disclosure.

What is claimed is:

1. A cell assembling device comprising:
   an input circuit for receiving input signal multiplexed on a plurality of channels and decomposing said input signals into units of data on a channel-by-channel basis, each of the units of data being to be included in a cell;
   a first storage for temporarily storing said units of data being channel by channel, and responsive to a read command for outputting one of said units of data which is designated by the read command;
   a cell forming circuit for adding cell header information to the one unit of data output from said first storage to thereby form a cell; and
   an arbitrating circuit for determining one of the channels which has a unit of data stored in said first storage satisfying a predetermined condition, for generating the read command designating the one channel, and for feeding said read command to said first storage.

2. A device in accordance with claim 1, wherein the predetermined condition is such that said arbitrating circuit generates read commands in an order in which a unit of data of a channel written first to said first storage is output first from said first storage.

3. A device in accordance with claim 1, wherein said arbitrating circuit comprises a second storage for storing threshold values each threshold value being assigned to one of the channels the predetermined condition being such that an amount of a unit of data of the one channel stored in said first storage has reached the threshold value assigned to the one channel.

4. A device in accordance with claim 1, wherein said arbitrating circuit includes a First-In First-Out (FIFO) controller for temporarily storing storage information corresponding to said units of data written to said first storage channel by channel and for outputting the stored storage information in a FIFO manner, the predetermined condition being such that said arbitrating circuit generates the read command for the one channel based on the storage information output from said FIFO controller in the FIFO manner.

5. A device in accordance with claim 1, wherein said arbitrating circuit comprises a second storage for storing priority values each priority value being assigned to one of the channels, the predetermined condition being such that a value represented by storage information associated with a unit of data of the one channel stored in said first storage has reached the priority value assigned to the one channel.

6. A device in accordance with claim 5, wherein said arbitrating circuit comprises a third storage for storing a preselected priority order assigned to the channels or blocks, each block being associated with at least two of the channels, the predetermined condition being such that, when at least two of the channels reach said respective priority values simultaneously, said arbitrating circuit generates said read command based on the preselected priority order such that a unit of data of the one channel or one of the blocks which has a higher degree of priority is output with priority.

7. A device in accordance with claim 1, wherein said input circuit issues a write report when writing a unit of data of a channel into said first storage, said arbitrating circuit determining the one channel by monitoring the write report channel by channel.

8. A device for assembling a cell to be transmitted on an ATM (Asynchronous Transfer Mode), comprising:
   an input circuit for receiving input signals multiplexed on a plurality of channels, and decomposing the input signals into units of data on a channel-by-channel basis, each of the units of data being to be included in a cell;
   a first storage for temporarily storing the units of data channel by channel, and being responsive to a read command for outputting one of the units of data which is designated by the read command;
   a cell forming circuit for adding cell header information to the one unit of data ouput from said first storage to thereby form a cell to be transmitted on the ATM; and
   an arbitrating circuit for controlling channel by channel an amount of the units of data stored in said first storage, for determining one of the channels which has a unit of data stored in said first storage satisfying a predetermined condition, for generating the read command designating the one channel, and for feeding the read command to said first storage.

9. A device in accordance with claim 8, wherein the predetermined condition is such that the amount of a unit of data of the one channel stored in said first storage reaches a predetermined value.

10. A device in accordance with claim 9, wherein the predetermined value corresponds to one cell.

11. A device in accordance with claim 8, wherein said arbitrating circuit comprises a controller for generating the read command in an order in which a unit of data of a channel written first into said first storage is output first from said first storage.

12. A device in accordance with claim 8, wherein said arbitrating circuit comprises:
   a second storage for storing threshold values, each threshold value being assigned to one of the channels; and
   a controller for determining the one channel which has an amount of a unit of data stored in said first storage which has reached the threshold value assigned to the one channel.

13. A device in accordance with claim 8, wherein said arbitrating circuit comprises:
   a First-In First-Out (FIFO) storage for temporarily storing storage information representative of the amount of the units of data stored in said first storage channel by channel, and for outputting the stored storage information in a FIFO manner; and a controller for generating the read command for the one channel based on the storage information output from said FIFO controller in the FIFO manner.

14. A device in accordance with claim 8, wherein said arbitrating circuit comprises a second storage for storing priority values, each priority value being assigned to one of the channels; and a controller for generating the read command for the one channel associated with storage information representing an amount of a unit of data stored in said first storage, which said amount has reached the priority value assigned to the one channel.

15. A device in accordance with claim 14, wherein said arbitrating circuit comprises a third storage for storing a preselected priority order assigned to the channels or blocks, each block being associated with at least two of the channels; and a controller for generating, when at least two of the channels reach the respective priority values simultaneously, the read command based on the preselected priority order such that a unit of data of the one channel or one of the blocks which has a higher degree of priority is output with priority.

16. A device in accordance with claim 8, wherein said input circuit issues a write report when writing a unit of data of a channel into said first storage, said arbitrating circuit determining the one channel by monitoring the write report channel by channel.

* * * * *